J. O. SPANG.
AUTOMATIC SWIVEL LAMP FOR AUTOMOBILES.
APPLICATION FILED DEC. 17, 1908.

922,055.

Patented May 18, 1909.

WITNESSES

INVENTOR.
J. O. SPANG.

UNITED STATES PATENT OFFICE.

JULIUS OTTO SPANG, OF HAILEYBURY, ONTARIO, CANADA, ASSIGNOR OF ONE-HALF TO JOHN EDWARD HAMMELL, OF HAILEYBURY, CANADA.

AUTOMATIC SWIVEL-LAMP FOR AUTOMOBILES.

No. 922,055.  Specification of Letters Patent.  Patented May 18, 1909.

Application filed December 17, 1908. Serial No. 468,028.

*To all whom it may concern:*

Be it known that I, JULIUS OTTO SPANG, of the village of Haileybury, in the district of Nipissing, in the Province of Ontario, Canada, have invented certain new and useful Improvements in Automatic Swivel-Lamps for Automobiles, of which the following is the specification.

My invention relates to improvements in automatic swivel lamps for automobiles, and the object of the invention is to devise a holder, which will provide for the automatic swinging of the lenses, so as to direct the light to follow the course of the automobile as it passes around curves, and thereby minimize the liability to accidents due to the use of the stationary form of lamps at present in use.

A further object is to make the holder and actuating means readily adaptable to various makes of automobiles, and such as will not be liable to be effected by the jolting of the car.

A still further object is to provide a holder of this class in which the jar on the lamp will be reduced to a minimum.

Figure 1:
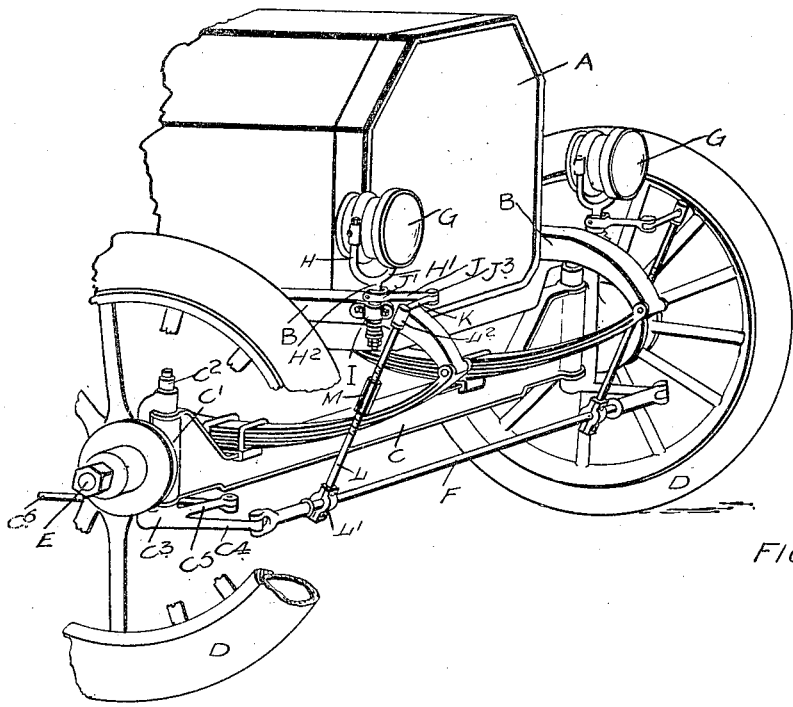
Figures 2, 3, 4:
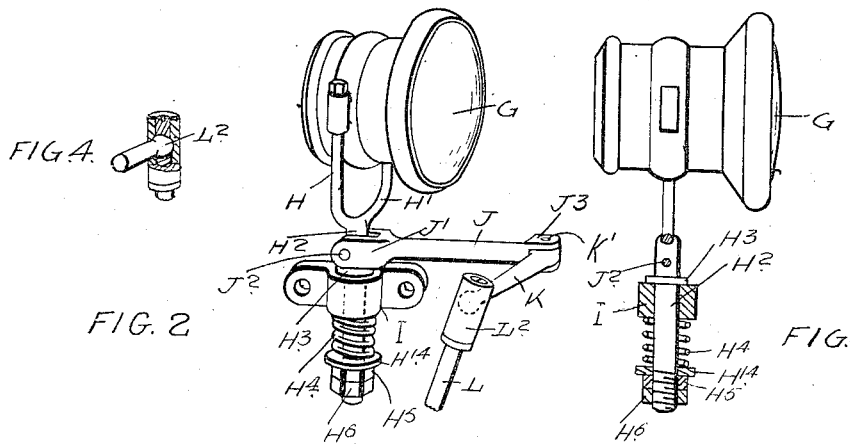

To effect these objects my invention consists of a holder comprising a stem having a forked upper end in which the lamp is pivotally held, a socket for the stem attached to the frame at each side of the automobile, an arm attached to the stem and provided with a supplemental arm and a rod connecting the supplemental arm to the front cross rod of the steering gear of the front wheels, the parts being otherwise constructed and arranged in detail as hereinafter more particularly explained Figure 1, is a perspective view of the front portion of an automobile broken away to exhibit the application of my improved swivel lamp thereto. Fig. 2, is an enlarged perspective detail of the lamp and holder therefor. Fig. 3, is an elevation of a lamp and holder partially in section. Fig. 4, is a detail of the socket connection of the supplemental arm to the connecting arm.

In the drawings like letters of reference indicate corresponding parts in each figure.

Search light lamps of automobiles as is well known are secured in a stationary position at the front of the vehicle. In going around corners, such stationary lamps direct the light straight ahead and do not follow the arc taken by the wheels in turning. The result has been many accidents on account of the darkness in proximity to the wheels outside of the rays of the lamp as the motor is being turned, such darkness concealing in many instances curb stones and other obstructions. It is with the object of directing the light to follow the course of the wheels and obviate the objection of the stationary lamps heretofore used that my invention is particularly designed.

A is the engine casing, B the side bars of the main frame, C the front axle and D the front wheels. C' are the vertical bearings in which are journaled the posts $C^2$ forming part of the brackets $C^3$, which carry the short axle E of the front wheels. $C^4$ are forwardly extending arms from the brackets $C^3$. $C^5$ is the arm forming portion of the brackets $C^3$, which is connected to a rod $C^6$ whereby the brackets $C^3$ are turned in order to turn the wheels. F is a rod connecting the ends of the arms $C^4$. All the parts, which I have now described are commonly in use in automobiles in connection with the steering of the front wheel.

G are lamps, which are pivotally hung in the forked bracket H' of the holder H. $H^2$ is the stem of the holder, which is provided with a shoulder $H^3$, whereby it is supported upon the bearing brackets I, which are secured to the side bars B of the frame. The stem $H^2$ is encircled by a spiral spring $H^4$ underneath the bearing brackets I.

$H^{14}$ is a washer, and $H^5$ and $H^6$ are nuts screwed on to the lower threaded end $H^2$ and designed to hold the spiral spring in position. The spring $H^4$ serves to relieve the jolt of the vehicle upon the lamp.

J is an arm, which is provided with a jaw J' through the members of which extend the pin $J^2$ into the stem $H^2$, thereby forming a hinged connection of the arm to the stem $H^2$. $J^3$ is a jaw formed at the opposite end of the arm J and at right angles to the plane of the face of the jaw J'.

K is an arm pivotally swung on the pin K' passing through the members of the jaw $J^3$.

L is a rod connected at the bottom by a suitable clip L' to the cross rod F. The upper end of the rod L is provided with a socket $L^2$ in which fits the ball-shaped end of the supplemental arm K. Each rod L is provided with a turn buckle M of the usual form, whereby the length of the rod may be adjusted to different heights of frame or more properly the distance of the frame from the steering gear.

It will now be seen upon the steering gear being manipulated so as to throw the cross rod F laterally, that motion will be communicated from the rod F through the rod L and arms K and J to the stem $H^2$ and consequently serve to swing or swivel the lamps and direct their rays, so as to follow the course of the wheels.

On account of the loose or flexible connection of the rod L to the stem as hereinbefore described the jarring or jolting of the vehicle is not liable to throw the turning mechanism of the lamp out of order.

What I claim as my invention is:

A search light for automobiles comprising the lamp proper and a holder therefor provided with a suitable stem vertically disposed, a socket to receive the stem secured to the frame, an arm having the inner jaw pivotally held on the stem and an outer jaw, a rod secured to the cross bar of the turning gear at the bottom end and provided with a ball socket at the upper end, and a supplemental arm having a ball fitting in the aforesaid socket and the opposite end pivotally held within the outer jaw of the aforesaid arm as and for the purpose specified.

JULIUS OTTO SPANG.

Witnesses:
B. BOYD,
R. COBAIN.